(12) United States Patent
You

(10) Patent No.: US 11,689,334 B2
(45) Date of Patent: *Jun. 27, 2023

(54) METHOD FOR SUBMITTING DATA IN SEQUENCE, NETWORK DEVICE AND TERMINAL DEVICE

(71) Applicant: GUANGDONG OPPO MOBILE TELECOMMUNICATIONS CORP., LTD., Guangdong (CN)

(72) Inventor: Xin You, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 40 days.

This patent is subject to a terminal disclaimer.

(21) Appl. No.: 17/231,573

(22) Filed: Apr. 15, 2021

(65) Prior Publication Data

US 2021/0234660 A1    Jul. 29, 2021

Related U.S. Application Data

(63) Continuation of application No. 16/892,444, filed on Jun. 4, 2020, now Pat. No. 11,018,832, which is a
(Continued)

(30) Foreign Application Priority Data

Jun. 15, 2018    (WO) ................ PCT/CN2018/091672

(51) Int. Cl.
*H04W 4/00*       (2018.01)
*H04L 5/00*       (2006.01)
(Continued)

(52) U.S. Cl.
CPC .......... *H04L 5/0053* (2013.01); *H04L 47/624* (2013.01); *H04W 36/02* (2013.01);
(Continued)

(58) Field of Classification Search
None
See application file for complete search history.

(56) References Cited

U.S. PATENT DOCUMENTS 10,419,982 B1 *   9/2019   Gundavelli ............. H04L 45/34
11,102,670 B2 *   8/2021   Jo ....................... H04L 47/2441
(Continued)

FOREIGN PATENT DOCUMENTS

CN          1968198 A       5/2007
CN        102438284 A       5/2012
(Continued)

OTHER PUBLICATIONS

Examination Report for European Application No. 18922754.9 dated Nov. 29, 2021. 6 pages.
(Continued)

*Primary Examiner* — Bob A Phunkulh
(74) *Attorney, Agent, or Firm* — Perkins Coie LLP

(57) ABSTRACT

Disclosed are a method for submitting data in sequence, a network device, a terminal device and a computer storage medium. The method comprises: when a bearer of data streams is transferred from a first network device to a second network device, the first network device sends first instruction information to the second network device, wherein the first instruction information is used for instructing the second network to transmit the transferred data streams on a new bearer in sequence.

12 Claims, 6 Drawing Sheets

Related U.S. Application Data continuation of application No. PCT/CN2018/104908, filed on Sep. 10, 2018.

(51) Int. Cl.
  *H04W 76/12* (2018.01)
  *H04W 76/15* (2018.01)
  *H04L 47/62* (2022.01)
  *H04W 36/02* (2009.01)
  *H04W 36/18* (2009.01)
  *H04W 88/16* (2009.01)

(52) U.S. Cl.
  CPC ........... *H04W 36/18* (2013.01); *H04W 76/12* (2018.02); *H04W 76/15* (2018.02); *H04W 88/16* (2013.01)

(56) References Cited

U.S. PATENT DOCUMENTS

| | | | |
|---|---|---|---|
| 11,425,594 | B2* | 8/2022 | Turtinen ........... H04W 28/0252 |
| 2009/0046638 | A1 | 2/2009 | Rappaport et al. |
| 2009/0245204 | A1 | 10/2009 | Voyer et al. |
| 2013/0058308 | A1* | 3/2013 | Jaiswal ............. H04W 36/0016 370/331 |
| 2013/0324114 | A1* | 12/2013 | Raghothaman ....... H04W 76/14 455/426.1 |
| 2015/0043492 | A1 | 2/2015 | Baek et al. |
| 2015/0117183 | A1 | 4/2015 | Heo et al. |
| 2016/0165499 | A1* | 6/2016 | Xu .................... H04W 36/0033 370/331 |
| 2016/0262194 | A1 | 9/2016 | Zhang et al. |
| 2016/0352578 | A1 | 12/2016 | Chen et al. |
| 2017/0013650 | A1 | 1/2017 | Fujishiro et al. |
| 2017/0265175 | A1* | 9/2017 | Gandhi ................ H04W 76/20 |
| 2018/0049083 | A1 | 2/2018 | Kubota et al. |
| 2018/0270792 | A1 | 9/2018 | Park et al. |
| 2018/0270809 | A1 | 9/2018 | Park et al. |
| 2018/0270894 | A1 | 9/2018 | Park et al. |
| 2018/0270895 | A1 | 9/2018 | Park et al. |
| 2018/0279193 | A1 | 9/2018 | Park et al. |
| 2018/0279218 | A1 | 9/2018 | Park et al. |
| 2018/0279229 | A1 | 9/2018 | Dinan et al. |
| 2018/0279262 | A1 | 9/2018 | Babaei et al. |
| 2018/0279358 | A1 | 9/2018 | Babaei et al. |
| 2018/0324631 | A1* | 11/2018 | Jheng ................ H04W 28/0268 |
| 2018/0367288 | A1 | 12/2018 | Vrzic et al. |
| 2019/0174375 | A1* | 6/2019 | Hapsari ................ H04W 88/14 |
| 2019/0174377 | A1* | 6/2019 | Decarreau ............ H04W 36/30 |
| 2019/0268818 | A1* | 8/2019 | Yi ..................... H04W 36/0033 |
| 2019/0320476 | A1 | 10/2019 | Wang et al. |
| 2019/0387569 | A1 | 12/2019 | Martinez Tarradell et al. |
| 2019/0394651 | A1 | 12/2019 | Wifvesson et al. |
| 2020/0029389 | A1 | 1/2020 | Yilmaz et al. |
| 2020/0077356 | A1* | 3/2020 | Youn .................... H04W 68/02 |
| 2020/0107189 | A1* | 4/2020 | Sharma ................ H04W 36/02 |
| 2020/0154320 | A1 | 5/2020 | Xu et al. |
| 2020/0154331 | A1* | 5/2020 | Yang .................... H04W 12/033 |
| 2021/0211960 | A1* | 7/2021 | Ryu ..................... H04W 36/14 |

FOREIGN PATENT DOCUMENTS

| | | |
|---|---|---|
| CN | 102651892 A | 8/2012 |
| CN | 106993313 A | 7/2017 |
| CN | 107404396 A | 11/2017 |
| CN | 107484183 A | 12/2017 |
| CN | 107770807 A | 3/2018 |
| CN | 107786493 A | 3/2018 |
| EP | 3493582 A1 | 6/2019 |
| KR | 20000071228 A | 11/2000 |
| KR | 20180021650 A | 3/2018 |
| RU | 2431925 C2 | 10/2011 |
| RU | 2633163 C2 | 10/2017 |
| WO | 2016021820 A1 | 2/2016 |
| WO | 2017118225 A1 | 7/2017 |
| WO | 2018032991 A1 | 2/2018 |

OTHER PUBLICATIONS

Huwawei et al. "QoS Flow Level Offloading in NR-DC" R2-1802267; 3GPP TSG-RAN WG2 Meeting #101; Athens, Greece; Feb. 26-Mar. 2, 2018. 4 pages.
IPA, Notice of Acceptance for Australian Patent Application No. 2018427836. dated Jun. 23, 2021. 3 pages.
KIPO, Notification of Reason for Refusal for Korean Patent Application No. 10-2020-7025593. dated Aug. 5, 2021. 8 pages with English translation.
MediaTek Inc. "QoS Flow to DRB Remapping during Handover" R2-1708004; 3GPP TSG-RAN WG2 Meeting #99; Berlin, Germany; Aug. 21-25, 2017. 4 pages.
Rospatent, Decision to Grant a Patent for Invention for Russian Patent Application No. 2020127015. dated May 24, 2021. 24 pages with English translation.
Supplemental Notice of Allowability dated Apr. 21, 2021 of U.S. Appl. No. 16/892,444, filed Jun. 4, 2020. 3 pages.
3GPP TS 37.324 V15.0.0 (Jun. 2018)—3rd Generation Partnership Project; Technical Specification Group Radio Access Network; E-UTRA and NR; Service Data Adaptation Protocol (SDAP) specification (Release 15) (13 pages).
3GPP TS 37.340 V15.1.0 (Mar. 2018)—3rd Generation Partnership Project; Technical Specification Group Radio Access Network; Evolved Universal Terrestrial Radio Access (E-UTRA) and NR; Multi-connectivity; Stage 2 (Release 15) (52 pages).
EPO, Extended European Search Report for European Patent Application No. 18922754.9. dated Feb. 25, 2021. 10 pages.
Final Office Action dated Nov. 20, 2020 of U.S. Appl. No. 16/892,444, filed Jun. 4, 2020.
International Search Report dated Feb. 26, 2019 of PCT/CN2018/091672 (2 pages).
International Search Report dated Feb. 27, 2019 of PCT/CN2018/104908 (4 pages).
IPA, Examination Report No. 1 for Australian Patent Application No. 2018427836. dated Jan. 19, 2021. 5 pages.
Non-Final Office Action dated Aug. 6, 2020 of U.S. Appl. No. 16/892,444, filed Jun. 4, 2020.
Notice of Allowance dated Jan. 29, 2021 of U.S. Appl. No. 16/892,444, filed Jun. 4, 2020.
Huawei "pCR to 38.460 on secondary node modification triggered by gNB-CU-CP" R3-182134; 3GPP TSG-RAN3 Meeting #99bis; Sanya, China, Apr. 16-20, 2018. 6 pages.
Huawei et al. "TS 23.502 End-Marker during HO Procedure" S2-178059; SA WG2 Meeting #123; Ljubljana, Slovenia, Oct. 23-27, 2017. 14 pages.
Qualcomm Incorporated "User Plane for Handover without WT Change" R2-162484; 3GPP TSG-RAN WG3 Meeting #93bis; Sophia Antipolis, France, Oct. 10-14, 2016. 7 pages.
Second Office Action of the Japanese application No. 2020-544643, dated Mar. 8, 2022. 6 pages with English Translation.
Examination Report for Indian Application No. 202017031903 dated Sep. 15, 2021. 6 pages with English translation.
Examiner's Report for Canadian Application No. 3089382 dated Aug. 30, 2021. 4 pages.
Notice of Reasons for Refusal for Japanese Application No. 2020-544643 dated Oct. 19, 2021. 6 pages with English translation.
Examination Report for European Application No. 18922754.9 daed Jun. 28, 2022. 7 pages.
Examiner's Report for Canadian Application No. 3089382 dated Aug. 11, 2022. 5 pages.
Ericsson "Data forwarding aspects for DC bearer type change and QoS flow offloading" R3-182743; 3GPP TSG-RAN WG3 Meeting #100; Busan, Korea, May 21-25, 2018. 3 pages.
First Office Action for Chinese Application No. 202010564121.4 dated Oct. 8, 2022. 17 pages with English translation.

(56) References Cited

OTHER PUBLICATIONS

Li, S. "Mobility Management and Packet Reordering Processing in FiWi Networks" Dissertation, May 10, 2012; University of Science and Technology of China. 153 pages.
Mahapatra, S. et al. "ART based cell formation using combined operation sequence and time" Proceedings of the 2008 IEEE IEEM. pp. 1209-1213.
Zhu, D. et al. "QOS Guarantee Measurement for TD-LTE Bearer Network in CBTC Application Environment" 2017, vol. 20, No. 6. 12 pages with English translation.

* cited by examiner

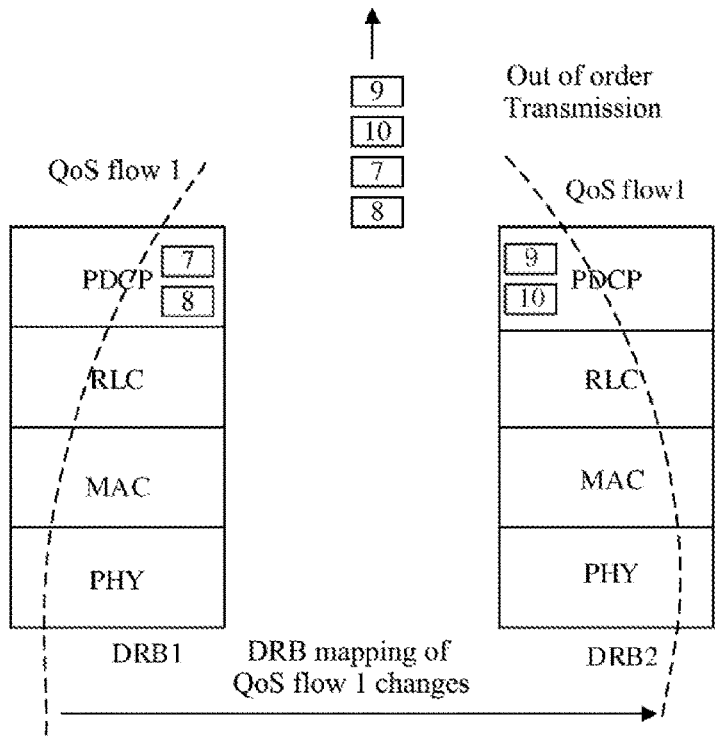

FIG. 5

Prior Art

601
When a bearer of the data flow is transferred from a first network device to a second network device, the first network device maintains an original Data Radio Bearer (DRB), transmits first partial data of the data flow which have not been acknowledged to the terminal device, and forwards second partial data from a core network to the second network device 602
When the second partial data of the data flow are completely sent to the second network device, send first indication information to the second network device

FIG. 6

METHOD FOR SUBMITTING DATA IN SEQUENCE, NETWORK DEVICE AND TERMINAL DEVICE

CROSS-REFERENCE TO RELATED APPLICATIONS

This application is a continuation application of U.S. application Ser. No. 16/892,444 filed on Jun. 4, 2020, which is a continuation application of International Application No. PCT/CN2018/104908 having an international filing date of Sep. 10, 2018, which claims priority to PCT Application No. PCT/CN2018/091672 filed on Jun. 15, 2018, and the entire disclosures of all the applications are hereby incorporated by reference.

TECHNICAL FIELD

The present disclosure relates to the field of information processing technology, in particular to a method for delivering data in order, a network device, a terminal device and a computer storage medium.

BACKGROUND

Main application scenarios of 5G are: Enhanced Mobile Broadband (eMBB), Ultra Reliable Low Latency Communications (URLLC), and massive Machine Type of Communication (mMTC). During early deployment of NR, full NR coverage is difficult to obtain, so typical network coverage is wide-area LTE coverage and island coverage mode of the NR. Moreover, a large amount of LTE is deployed below 6 GHz, and there is very little spectrum below 6 GHz that may be used for the 5G. Therefore, the NR must study spectrum applications above 6 GHz. At the same time, in order to protect the mobile operators' previous investment in the LTE, a working mode of tight interworking between the LTE and the NR is proposed. The NR may also be deployed independently.

In order to be able to realize 5G network deployment and commercial applications as soon as possible, 3GPP first completes a first 5G version, namely LTE-NR Dual Connectivity (EN-DC), before the end of December 2017. Here the LTE serves as a Master Node (MN), the NR serves as a Secondary Node (SN), and the network deployment and networking architecture are shown in FIGS. 1-3. In Dual Connectivity (DC), EN-DC, NE-DC, 5GC-EN-DC, and NR DC are included. In the EN-DC, an LTE node is used as an MN node and an NR node is used as an SN node, to connect an EPC core network. The NR in the NE-DC is used as an MN node and eLTE is used as an SN node, to connect a 5GC core network. In the 5GC-EN-DC, the eLTE serves as an MN node and the NR serves as SN node, to connect a 5GC core network. In the NR DC, the NR is used as an MN node and the NR is used as an SN node, to connect a 5GC core network. A bearer type in a DC mode is shown in FIG. 4. In LTE DC, bearer types of a user plane include a Main Cell Group (MCG) bearer, a Secondary Cell Group (SCG) bearer, and a MCG Split bearer. In order to minimize changes between the MCG split bearer and an SCG split bearer, a concept of bearer harmonization is proposed, i.e. the MCG split bearer and the SCG split bearer are unified into Split bearers.

In 5G NR, a new protocol layer Service Data Adaptation Protocol (SDAP) of is introduced, wherein the protocol layer is used to map data of a QoS data flow (Flow) from a core network to different DRBs. And the eLTE supports an LTE base station to access a 5G core network in the LTE, so a protocol stack of the eLTE also contains the SDAP protocol. As shown in FIG. 5, for the NE-DC, the 5GC-EN-DC and the NR DC, every MN, SN node in them uses the SDAP protocol. Therefore, in a process of bearer change in the prior art, a problem of out of order delivery exists.

SUMMARY

In order to solve the above technical problem, implementations of the present disclosure provide a method for delivering data in order, a network device, a terminal device and a computer storage medium.

An implementation of the present disclosure provides a method for delivering data in order, which is applied to a first network device, and the method includes: when a bearer of a data flow is transferred from the first network device to a second network device, sending, by the first network device, first indication information to the second network device; wherein the first indication information is used for indicating the second network device to start performing, on a new bearer, in-order transmission of the transferred data flow.

An implementation of the present disclosure provides a method for delivering data in order, which is applied to a second network device, and the method includes: when a bearer of a data flow is transferred from a first network device to the second network device, receiving first indication information sent from the first network device; wherein the first indication information is used for indicating the second network device to start performing, on a new bearer, in-order transmission of the transferred data flow.

An implementation of the present disclosure provides a method for delivering data in order, which is applied to a terminal device, and the method includes: when a bearer of a data flow is transferred from a first network device to a second network device, transmitting, by the terminal device, first partial data of the data flow and second indication information to the first network device; and the second indication information is used for indicating that the first partial data in the data flow, which have not been transmitted completely when the transferring occurs, are transmitted completely.

An implementation of the present disclosure provides a method for delivering data in order, which is applied to a first network device, and the method includes: when a bearer of a data flow is transferred from the first network device to a second network device, receiving first partial data of the data flow sent from a terminal device and second indication information sent from the terminal device; the second indication information is used for indicating that the first partial data in the data flow, which have not been transmitted completely when the transferring occurs, are transmitted completely; and sending the first partial data of the data flow and the second indication information to the second network device, or sending the first partial data of the data flow to a core network and sending the second indication information to the second network device.

An implementation of the present disclosure provides a method for delivering data in order, which is applied to a second network device, and the method includes: when a bearer of a data flow is transferred from a first network device to the second network device, receiving first partial data of the data flow sent from the first network device and second indication information, or receiving second indication information sent from the first network device; the second indication information is used for indicating that the first partial data in the data flow, which have not been transmitted completely when the transferring occurs, are transmitted completely; based on the second indication information, after delivering the first partial data to a core network, delivering, by the second network device, second partial data of the data flow to the core network.

An implementation of the present disclosure provides a first network device, including: a first communication unit, which sends, when a bearer of a data flow is transferred from the first network device to a second network device, first indication information to the second network device; wherein the first indication information is used for indicating the second network device to start performing, on a new bearer, in-order transmission of the transferred data flow.

An implementation of the present disclosure provides a second network device, including: a second communication unit, which receives, when a bearer of a data flow is transferred from a first network device to the second network device, first indication information sent from the first network device; wherein the first indication information is used for indicating the second network device to start performing, on a new bearer, in-order transmission of the transferred data flow.

An implementation of the present disclosure provides a terminal device, including: a third communication unit, which transmits, when a bearer of a data flow is transferred from a first network device to a second network device, first partial data of a data flow and second indication information to the first network device; and the second indication information is used for indicating that the first partial data in the data flow, which have not been transmitted completely when the transferring occurs, are transmitted completely.

An implementation of the present disclosure provides a first network device, including: a fourth communication unit, which receives, when a bearer of a data flow is transferred from the first network device to a second network device, first partial data of the data flow sent from a terminal device and second indication information sent from the terminal device; the second indication information is used for indicating that the first partial data in the data flow, which have not been transmitted completely when the transferring occurs, are transmitted completely; and sends the first partial data of the data flow and the second indication information to the second network device, or sends the first partial data of the data flow to a core network and sends the second indication information to the second network device.

An implementation of the present disclosure provides a second network device, including: a fifth communication unit, which receives, when a bearer of a data flow is transferred from a first network device to the second network device, first partial data of the data flow sent from the first network device and second indication information, or receives second indication information sent from the first network device; the second indication information is used for indicating that the first partial data in the data flow, which have not been transmitted completely when the transferring occurs, are transmitted completely; a fifth processing unit, which delivers, based on the second indication information, after delivering the first partial data to a core network, second partial data of the data flow to the core network.

An implementation of the present disclosure provides a network device, including: a processor and a memory used for storing a computer program which is capable of being run on the processor, wherein the processor is used for, when running the computer program, executing acts of the aforementioned method.

An implementation of the present disclosure provides a terminal device, including: a processor and a memory used for storing a computer program which is capable of being run on the processor, wherein the processor is used for, when running the computer program, executing acts of the method.

An implementation of the present disclosure provides a computer storage medium, wherein the computer storage medium stores computer-executable instructions which implements, when being executed, acts of the aforementioned method.

BRIEF DESCRIPTION OF DRAWINGS

FIG. 5 is a schematic diagram of out of order delivery when bearer transferring appears in the prior art.

FIG. 6 is flowchart one of a method for delivering data in order according to an implementation of the present disclosure.

DETAILED DESCRIPTION

Figure 1:
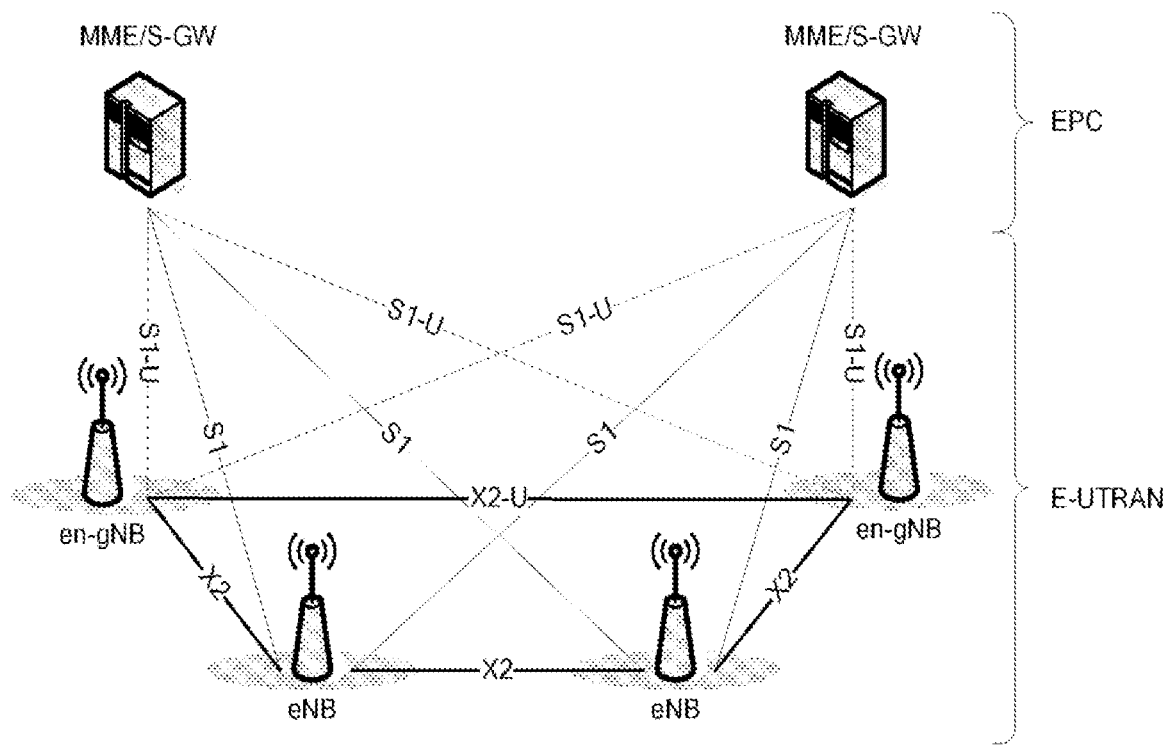
FIG. 1 is a schematic diagram of DC network deployment and networking architecture.
Figure 2:
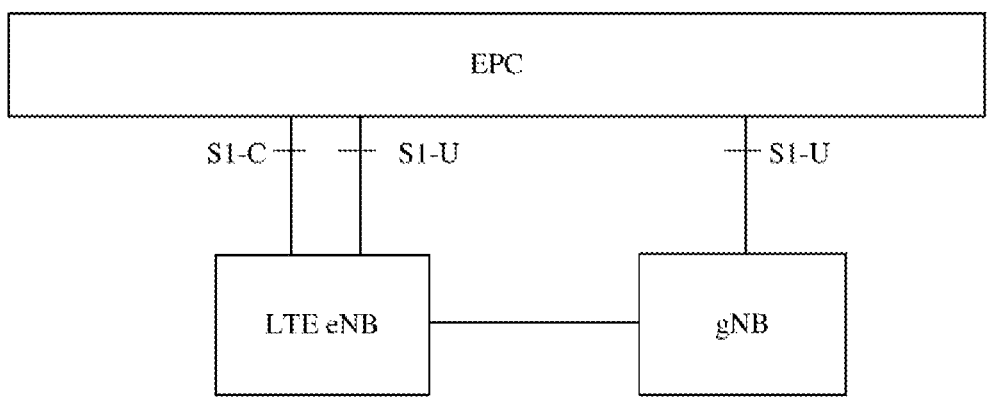
FIG. 2 is a schematic diagram of DC network deployment and networking architecture.
Figure 3:
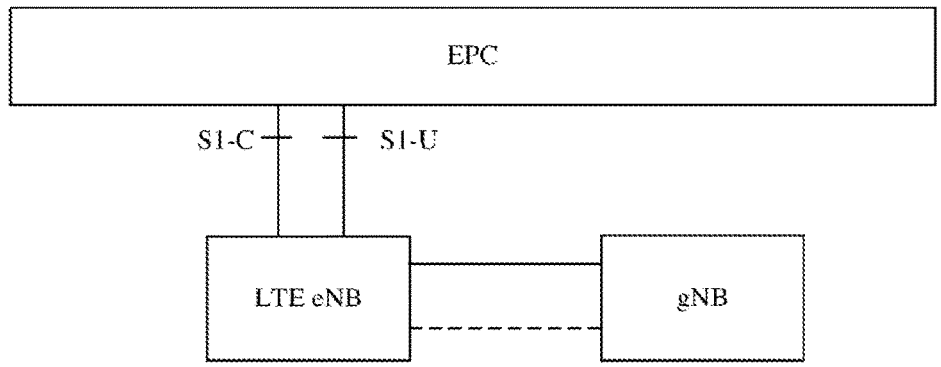
FIG. 3 is a schematic diagram of DC network deployment and networking architecture.
Figure 4:
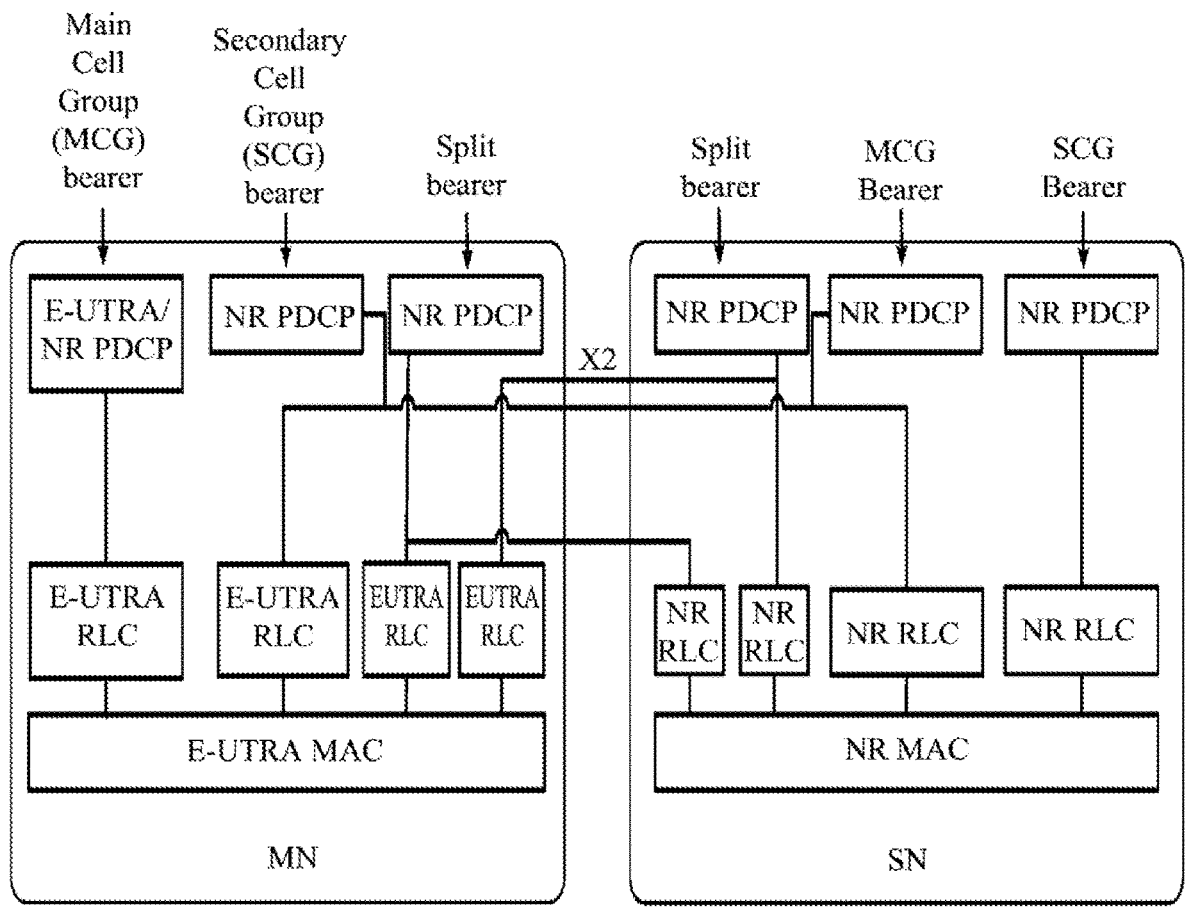
FIG. 4 is a schematic diagram of a bearer type in DC mode.

To understand features and technical contents of implementations of the present disclosure in more detail, the implementation of the implementations of the present disclosure will be described in detail below with reference to the drawings, which are used for reference only and are not intended to limit the implementations of the present disclosure.

Implementation One

The implementation of the present application provides a method for delivering data in order, which is applied to a first network device, and the method includes: when a bearer of a data flow is transferred from the first network device to a second network device, the first network device sends first indication information to the second network device; herein the first indication information is used for indicating the second network device to start performing, on a new bearer, in-order transmission of the transferred data flow.

The data flow in this implementation can be understood as a QoS Flow. The first network device may be an original node and the second network device may be a destination node. In addition, the first network device and the second network device may be a Master Node (MN) and a Secondary Node (SN) in Dual Connectivity (DC), respectively. Of course, they may also be other nodes in a DC scenario, but the details are not repeated here.

It should also be pointed out that the data flow in this implementation may be a QoS Flow.

In addition, when the bearer of the data flow is transferred from the first network device to the second network device, the first network device maintains an original Data Radio Bearer (DRB), transmits the first partial data of the data flow which have not been acknowledged to the terminal device, and forwards second partial data from a core network to the second network device.

Herein, the having not been acknowledged may be partial data for which ACK acknowledgement information sent from a receiving end has not been gotten. Moreover, the second partial data of the data flow are data which are still at the first network device while the data flow is transferred from the first network device to the second network device.

At this time, it may also include that the first network device sends the second partial data to the second network device till this partial data are sent out.

When the second partial data of the data flow are completely sent to the second network device, the first indication information is generated, and then the first indication information is sent to the second network device.

Herein, the first indication information may be a blank data packet, or may be a data packet which contains a preset identifier. Herein, the preset identifier may be set according to an actual condition, for example, it may be N-bit data, and the N-bit data is in a preset arrangement, which is not exhaustive in this implementation.

Further, the first network device sends the first indication information to the second network device, includes: the first network device sends the first indication information to the second network device through an Xn interface.

Specifically, refer to FIG. 6, which includes acts 601 and 602.

In act 601, when the bearer of the data flow is transferred from the first network device to the second network device, the first network device maintains an original Data Radio Bearer (DRB), transmits the first partial data of the data flow which have not been acknowledged to the terminal device, and forwards second partial data from a core network to the second network device.

In act 602, when the second partial data of the data flow are completely sent to the second network device, the first indication information is sent to the second network device.

Correspondingly, when the second network device receives the first indication information, the second network device may start performing in-order transmission of the transferred data flow on the new bearer. Herein, the in-order transmission may be that the second partial data of the data flow are first transmitted and then third partial data from the core network are transmitted. The second partial data are arranged before the third partial data for transmission when performing sorting, so it can be ensured that out of order does not appear when the bearer of the data flow is transferred.

Figure 7:
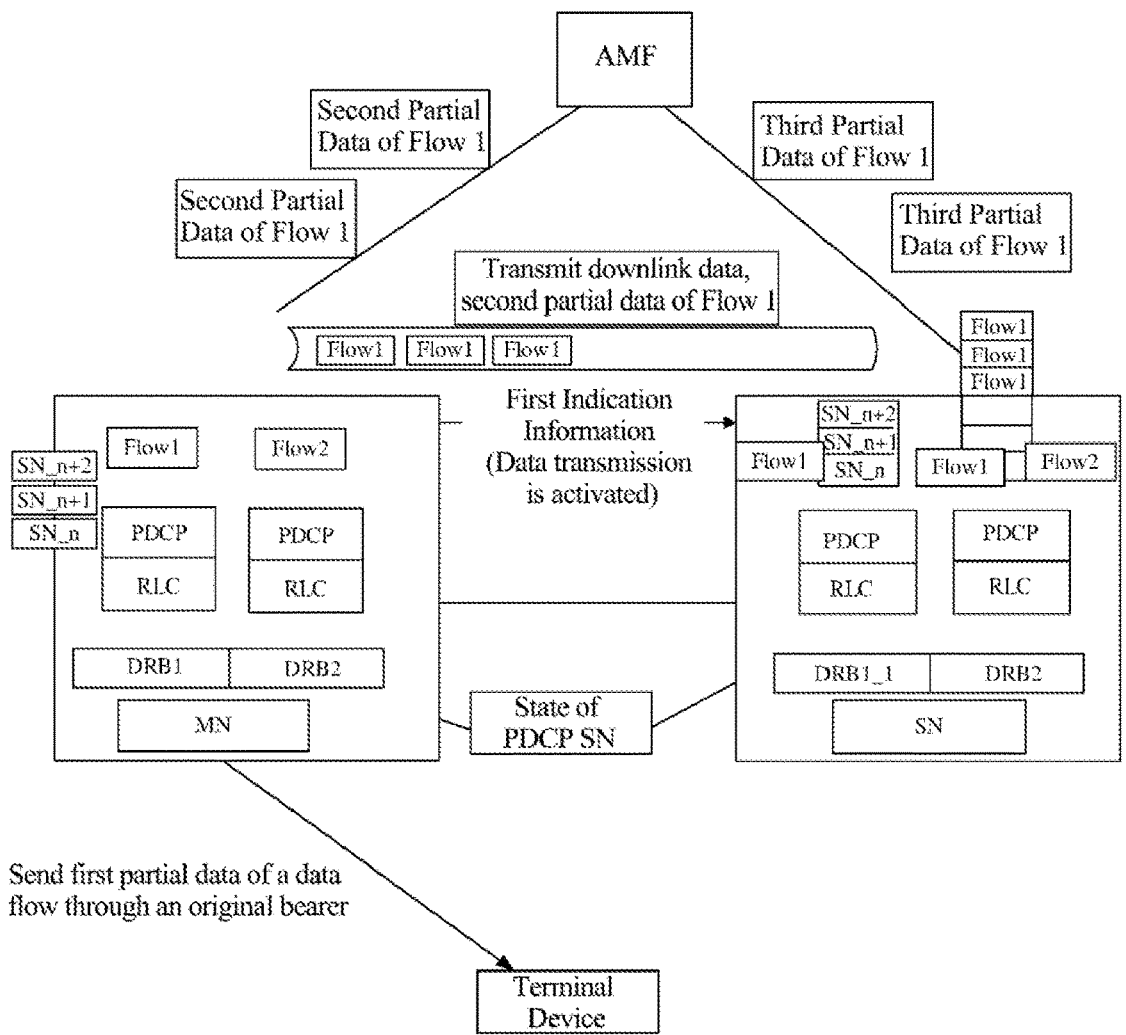
FIG. 7 is a schematic diagram of a downlink data processing scenario according to an implementation of the present disclosure.

The above scenario will be described below with reference to FIG. 7: for DownLink (DL) data, when a QoS Flow 1 is transferred from one node to another node, for example, transferred from MN to SN. A DRB of an original side node continues to be maintained (which may be for the first partial data of QoS Flow 1 sent from Access and Mobility Management Function (AMF)) after bearer is changed, the first partial data of the Flow 1 are kept being sent to the terminal device through an original bearer, and the original side node continues to transmit a first partial PDCP PDUs of the QoS Flow 1, that is, the first partial data of the QoS Flow 1, which have not been acknowledged by ACK. At the same time, the first network device receives second partial data from the core network and sends the second partial data to the second network device (i.e. the SN), till a remaining second part of the PDCP PDUs of the QoS Flow 1 which have not been acknowledged by ACK are all transmitted to the SN completely, and then the original side node (MN) sends the first indication information to a target side (SN) through the Xn interface. Herein, the indication indicates that the target side may start performing, on a new bearer, data transmission of the above transferred QoS Flow. It should also be pointed out that after the SN, that is, the second network device in this implementation, receives the second partial data of the data flow and the first indication information, it transmits the second partial data first and then transmits its own third partial data. In this way, it is ensured that the transmitted data will not be out of order.

It can be seen that by adopting the above solution, it is able that when a bearer of a data flow is transferred from a first network device to a second network device, the first network device sends the second network device first indication information, through which the second network device is caused to start performing, on a new bearer, in-order transmission of the transferred data flow. Therefore, it can be ensured that when data flow transferring occurs, a destination network device side can ensure the order of data transmission.

Implementation Two

The implementation of the present application provides a method for delivering data in order, which is applied to a second network device, and the method includes: when a bearer of a data flow is transferred from a first network device to the second network device, first indication information sent from the first network device is received. Herein the first indication information is used for indicating the second network device to start performing, on a new bearer, in-order transmission of the transferred data flow.

The data flow in this implementation can be understood as a QoS Flow. The first network device may be an original node and the second network device may be a destination node. In addition, the first network device and the second network device may be a Master Node (MN) and a Secondary Node (SN) in Dual Connectivity (DC), respectively. Of course, they may also be other nodes in a DC scenario, but the details are not repeated here.

It should also be pointed out that the data flow in this implementation may be a QoS Flow.

In addition, when the bearer of the data flow is transferred from the first network device to the second network device, the first network device maintains an original Data Radio Bearer (DRB), and transmits second partial data to the second network device. Correspondingly, the second network device will receive the second partial data of the data flow sent from the first network device.

When the second partial data of the data flow is completely sent to the second network device, the first indication information is generated, and then the first indication information is sent to the second network device.

Herein, the first indication information may be a blank data packet, or may be a data packet which contains a preset identifier. Herein, the preset identifier may be set according to an actual condition, for example, it may be N-bit data, and the N-bit data is in a preset arrangement, which is not exhaustive in this implementation.

Further, the first indication information sent by the first network device is received through an Xn interface.

The method also includes: receiving third partial data sent by a core network device; that is, when the bearer of the data flow is transferred, the second network device starts receiving the third partial data from the core network.

Figure 8:
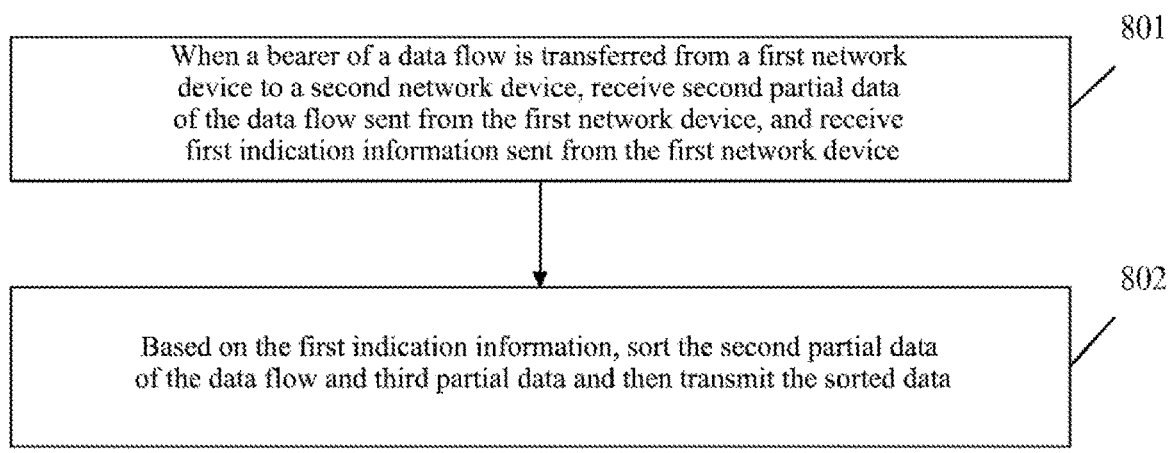
FIG. 8 is flowchart two of a method for delivering data in order according to an implementation of the present disclosure.

Specifically, refer to FIG. 8, and acts 801 and 802 are included.

In act 801, when the bearer of the data flow is transferred from the first network device to the second network device, receive the second partial data of the data flow sent from the first network device, and receive the first indication information sent from the first network device.

In act 802, based on the first indication information, sort the second partial data of the data flow and the third partial data and then transmit. Herein, the third partial data may be data received by the second network device from the core network.

When the second network device receives the first indication information, the second network device may start performing, on a new bearer, in-order transmission of the transferred data flow. Herein the in-order transmission may be that the second partial data are arranged to be transmitted before the third partial data.

Since the second partial data occurs when the data flow is transferred, the second partial data precedes the third partial data. Therefore, when sorting, the second partial data are arranged to be transmitted before the third partial data, thus it can be ensured that out of order does not appear when the bearer of the data flow is transferred.

The above scenario will be described below with reference to FIG. 7. For DownLink (DL) data, when a QoS Flow 1 is transferred from one node to another node, for example, transferred from MN to SN, a DRB of an original side node continues to be maintained (which may be for the first partial data of QoS Flow 1 sent from Access and Mobility Management Function (AMF)) after bearer is changed, the first partial data of the Flow 1 are kept being sent to the terminal device through an original bearer, and the original side node continues to transmit a first partial PDCP PDUs of the QoS Flow 1, that is, the first partial data of the QoS Flow 1, which have not been acknowledged by ACK. At the same time, the first network device receives second partial data from the core network and sends the second partial data to the second network device (i.e. the SN) till a remaining second part of the PDCP PDUs of the QoS Flow 1 which have not been acknowledged by ACK are all transmitted to the SN completely, and the original side node (MN) sends the first indication information to the target side (SN) through the Xn interface. Herein, the indication indicates that the target side may start performing, on a new bearer, data transmission of the above transferred QoS Flow. It should also be pointed out that after the SN, that is, the second network device in this implementation, receives the second partial data of the Flow and the first indication information, it transmits the second partial data first and then transmits its own third partial data. In this way, it is ensured that the transmitted data will not be out of order.

It can be seen that by adopting the above solution, it is able that when a bearer of a data flow is transferred from a first network device to a second network device, the first network device sends the second network device first indication information, through which the second network device is caused to start performing, on a new bearer, in-order transmission of the transferred data flow. Therefore, it can be ensured that when data flow transferring occurs, a destination network device side can ensure a sequence of data transmission.

Implementation Three

The implementation of the present application provides a method for delivering data in order, which is applied to a terminal device, and the method includes: when a bearer of a data flow is transferred from a first network device to a second network device, receive first partial data of the data flow sent from the first network device.

The data flow in this implementation can be understood as a QoS Flow. The first network device may be an original node and the second network device may be a destination node. In addition, the first network device and the second network device may be a Master Node (MN) and a Secondary Node (SN) in Dual Connectivity (DC), respectively. Of course, they may also be other nodes in a DC scenario, but the details are not repeated here.

It should also be pointed out that the data flow in this implementation may be a QoS Flow.

In addition, when the bearer of the data flow is transferred from the first network device to the second network device, the first network device maintains an original Data Radio Bearer (DRB), transmits the first partial data of the data flow which have not been acknowledged to the terminal device, and forwards second partial data from a core network to the second network device.

Receive the first partial data of the data flow sent from the first network device, includes: receiving the first partial data of the data flow which have not been acknowledged transmitted by the first network device, which maintains the original Data Radio Bearer (DRB).

The above scenario will be described below with reference to FIG. 7: for DownLink (DL) data, when a QoS Flow 1 is transferred from one node to another node, for example, transferred from MN to SN, a DRB of an original side node continues to be maintained (which may be for the first partial data of QoS Flow 1 sent from Access and Mobility Management Function (AMF)) after bearer is changed, the first partial data of the Flow 1 are kept being sent to the terminal device through an original bearer, and the original side node continues to transmit a first partial PDCP PDUs of the QoS Flow 1, that is, the first partial data of the QoS Flow 1, which have not been acknowledged by ACK. At the same time, the first network device receives second partial data from the core network and sends the second partial data to the second network device (i.e. the SN) till a remaining second part of the PDCP PDUs of the QoS Flow 1 which have not been acknowledged by ACK are all transmitted to the SN completely, and the original side node (MN) sends the first indication information to a target side (SN) through the Xn interface. Herein, the indication indicates that the target side may start performing, on a new bearer, data transmission of the above transferred QoS Flow. It should also be pointed out that after the SN, that is, the second network device in this implementation, receives the second partial data of the Flow and the first indication information, it transmits the second partial data first and then transmits its own third partial data. In this way, it is ensured that the transmitted data will not be out of order.

It can be seen that by adopting the above solution, it is able that when a bearer of a data flow is transferred from a first network device to a second network device, the first network device sends the second network device first indication information, through which the second network device is caused to start performing, on a new bearer, in-order transmission of the transferred data flow. Therefore, it can be ensured that when data flow transferring occurs, a destination network device side can ensure the order of data transmission.

Implementation Four

The implementation of the present application provides a method for delivering data in order, which is applied to a terminal device, and the method includes: when a bearer of a data flow is transferred from a first network device to a second network device, the terminal device transmits first partial data of the data flow and second indication information to the first network device; and the second indication information is used for indicating that the first partial data in the data flow, which have not been transmitted completely when the transferring occurs, are transmitted completely.

This implementation is applicable to a scenario where bearer transferring of a data flow occurs when the terminal device sends uplink data to the network side.

The data flow in this implementation can be understood as a QoS Flow. The first network device may be an original node and the second network device may be a destination node. In addition, the first network device and the second network device may be a Master Node (MN) and a Secondary Node (SN) in Dual Connectivity (DC), respectively. Of course, they may also be other nodes in a DC scenario, but the details are not repeated here.

It should also be pointed out that the data flow in this implementation may be a QoS Flow.

The terminal device transmits the first partial data of the data flow to the first network device, includes: when the bearer of the data flow is transferred from the first network device to the second network device, a Data Radio Bearer (DRB) with the first network device is maintained, and a first partial PDCP PDUs of the data flow which have not been acknowledged is sent to the first network device.

That is to say, when a QoS Flow is transferred from one network device to another, such as transferred from MN to SN, the DRB of an original side network device continues to be maintained after bearer is changed, and a protocol stack corresponding to an original side node in a UE continues to transmit the first partial PDCP PDUs of the data flow which have not acknowledged by ACK to the first network device (e.g., an MN) through the original bearer.

In addition, the terminal device transmits the second partial data of the data flow to the second network device while executing the aforementioned solution.

When the terminal device transmits the first partial data of the data flow to the first network device completely, the terminal device generates the second indication information, and then transmits the second indication information to the first network device.

Herein, the second indication information may be a blank data packet, or may be a data packet which contains a preset identifier. Herein, the preset identifier may be set according to an actual condition, for example, it may be N-bit data, and the N-bit data is in a preset arrangement, which is not exhaustive in this implementation.

Figure 9:
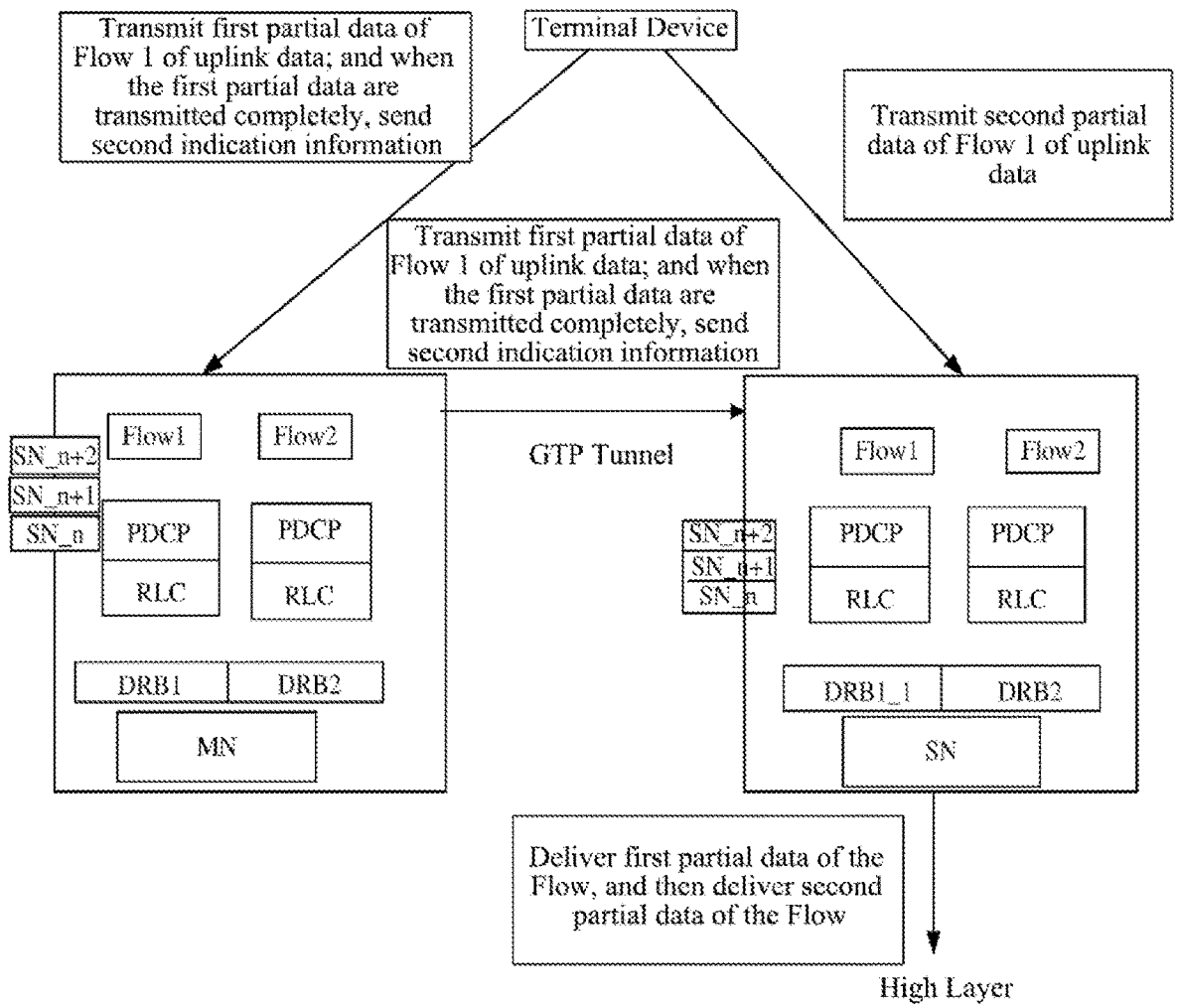
FIG. 9 is a schematic diagram of an uplink data processing scenario according to an implementation of the present disclosure.

The above scenario will be described below with reference to FIG. 9: for UL, firstly, when an SN node is established or during bearer is changed, a GTP tunnel is established on an Xn interface between an MN and the SN for transmitting data received by an original side.

When a bearer of a QoS data Flow is transferred from one node to another node, for example, transferred from MN to SN, a DRB of the original side node continues to be maintained after bearer is changed, and a protocol stack which corresponds to an original side node in a terminal continues to transmit PDCP PDUs which have not been acknowledged by ACK. As shown in the figure, the terminal device continues to send a first partial data of Flow 1 to the MN; and the second indication information is transmitted to the original side node when the first partial data of the Flow 1 is transmitted completely. Herein the second indication information may be located in a last data packet of the first partial data, and the second indication information is used for telling the original side node that the unfinished data transmission of the transferred QoS Flow has been completed.

The original side node delivers the first partial data, such as SDAP SDUs, of the Flow 1 which are received, and an SDAP end marker, i.e. the second indication information, to the target side node (SN) through the Xn interface. The target side node (SN) first sends data, SDAP SDUs, from the original side node to a core network, and after receiving the second indication information, sends second partial data of the Flow 1 which are received by the local side to the core network.

The original side node receives the first partial data of the Flow 1 such as the SDAP SDUs and the SDAP end marker, i.e., the second indication information. The original side node first sends the received SDAP SDUs to the core network through a GTP tunnel corresponding to a PDU session between the local node and the core network, and then transfers the SDAP end marker to the target side through the Xn interface. After the target side receives the end marker indication, it sends data received by the local side to the core network.

It can be seen that by adopting the above solution, it is able that when a bearer of a data flow is transferred from the first network device to the second network device, indication information is sent to the second network device, so that the second network device starts performing, on a new bearer, in-order transmission of the transferred data flow. Therefore, it can be ensured that when data flow transferring occurs, a destination network device side can ensure the order of data transmission.

Implementation Five

Figure 10:
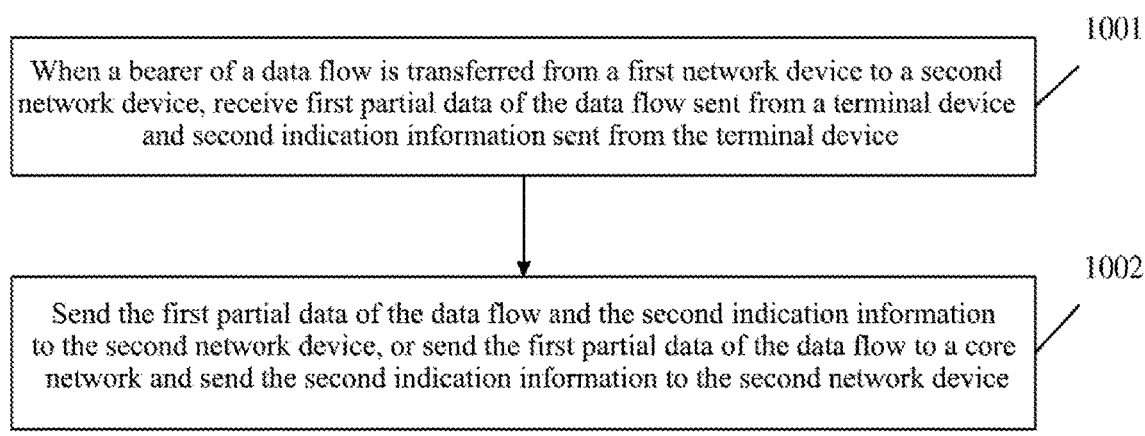
FIG. 10 is flowchart three of a method for delivering data in order according to an implementation of the present disclosure.

The implementation of the present application provides a method for delivering data in order, which is applied to a first network device, and as shown in FIG. 10, the method includes acts 1001 and 1002.

In act 1001, when a bearer of a data flow is transferred from the first network device to a second network device, first partial data of the data flow sent from a terminal device and second indication information sent from the terminal device are received. The second indication information is used for indicating that the first partial data in the data flow, which have not been transmitted completely when the transferring occurs, are transmitted completely.

In act 1002, the first partial data of the data flow and the second indication information are sent to the second network device, or the first partial data of the data flow are sent to a core network and the second indication information is sent to the second network device.

This implementation is applicable to a scenario where bearer transferring of a data flow occurs when the terminal device sends uplink data to the network side.

The data flow in this implementation can be understood as a QoS Flow. The first network device may be an original node and the second network device may be a destination node. In addition, the first network device and the second network device may be a Master Node (MN) and a Secondary Node (SN) in Dual Connectivity (DC), respectively. Of course, they may also be other nodes in a DC scenario, but the details are not repeated here.

It should also be pointed out that the data flow in this implementation may be a QoS Flow.

The receiving first partial data of the data flow sent from the terminal device includes: when the bearer of the data flow is transferred from the first network device to the second network device, the Data Radio Bearer (DRB) of the first network device continues to be maintained and a first partial PDCP PDUs of the data flow, which have not been acknowledged, sent from the terminal device are received.

That is to say, when a QoS Flow is transferred from one network device to another, such as transferred from MN to SN, the DRB of an original side network device continues to be maintained after bearer is changed, and a protocol stack corresponding to an original side node in a UE continues to transmit the first partial PDCP PDUs of the Flow which have not acknowledged by ACK to the first network device (e.g., an MN) through the original bearer.

In addition, the terminal device transmits the second partial data of the data flow to the second network device while executing the aforementioned solution.

When the terminal device transmits the first partial data of the data flow to the first network device completely, the terminal device generates the second indication information, and then transmits the second indication information to the first network device.

Herein, the second indication information may be a blank data packet, or may be a data packet which contains a preset identifier. Herein, the preset identifier may be set according to an actual condition, for example, it may be N-bit data, and the N-bit data is in a preset arrangement, which is not exhaustive in this implementation.

The sending first partial data of the data flow and the second indication information to the second network device includes: sending the first partial data of the data flow and the second indication information to the second network device through an Xn interface; or, sending the first partial data of the data flow to the core network and sending the second indication information to the second network device includes: sending the first partial data of the data flow to the core network through a GTP tunnel with the core network; and sending the second indication information to the second network device through an Xn interface.

The method also includes: a GTP tunnel with the second network device is established on the Xn interface. Herein the GTP tunnel is used for performing data forwarding to the second network device.

That is, when the first network device receives the first partial data and the second indication sent from the terminal device based on the original bearer, the first network device sends such information to the second network device in real time through the GTP tunnel established by the Xn interface with the second network device, so that the second network device sorts the first partial data and the second partial data received by the second network device, and then submits the sorted data to an upper layer.

The above scenario will be described below with reference to FIG. 9: for UL, firstly, when an SN node is established or during bearer changing, a GTP tunnel is established on an Xn interface between an MN and the SN for transmitting data received by an original side.

When a bearer of a QoS Flow is transferred from one node to another node, for example, transferred from MN to SN, a DRB of the original side node continues to be maintained after bearer is changed, and a protocol stack which corresponds to an original side node in a terminal continues to transmit PDCP PDUs which have not been acknowledged by ACK. As shown in the figure, the terminal device continues to send a first partial data of Flow 1 to the MN; and the second indication information is transmitted to the original side node when the first partial data of the Flow 1 is transmitted completely. Herein the second indication information may be located in a last data packet of the first partial data; and the second indication information is used for telling the original side node that the unfinished data transmission of the transferred QoS Flow has been completed.

The original side node delivers the first partial data, such as SDAP SDUs, of the Flow 1 which are received, and an SDAP end marker, i.e. the second indication information, to the target side node (SN) through the Xn interface. The target side node (SN) first sends data, SDAP SDUs, from the original side node to the core network, and after receiving the second indication information, sends second partial data of the Flow 1 which are received by the local side to the core network.

Or, when original side node receives the first partial data of the Flow 1, for example, SDAP SDUs, and an SDAP end marker, i.e., the second indication information, the original side node first sends the SDAP SDUs which are received to the core network through an GTP tunnel corresponding to a PDU session between the local node and the core network, and then transfers the SDAP end marker to the target side through the Xn interface. After the target side receives the second indication information, i.e., the SDAP end marker indication, it sends data received by the local side to the core network.

It can be seen that by adopting the above solution, it is able that when a bearer of a data flow is transferred from the first network device to the second network device, indication information is sent to the second network device, so that the second network device starts performing, on a new bearer, in-order transmission of the transferred data flow. Therefore, it can be ensured that when data flow transferring occurs, a destination network device side can ensure the order of data transmission.

Implementation Six

Figure 11:
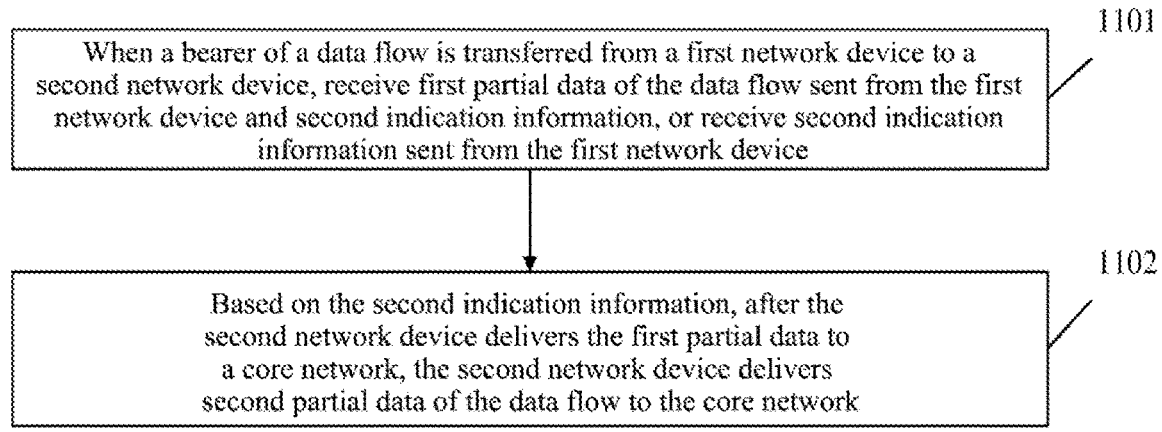
FIG. 11 is flowchart four of a method for delivering data in order according to an implementation of the present disclosure.

The implementation of the present application provides a method for delivering data in order, which is applied to a second network device, and as shown in FIG. 11, the method includes acts 1101 and 1102.

In act 1101, when a bearer of a data flow is transferred from a first network device to the second network device, first partial data of the data flow sent from the first network device and second indication information are received, or second indication information sent from the first network device is received. The second indication information is used for indicating that the first partial data in the data flow, which have not been transmitted completely when the transferring occurs, are transmitted completely.

In act 1102, based on the second indication information, after the second network device delivers the first partial data to a core network, the second network device delivers second partial data of the data flow to the core network.

This implementation is applicable to a scenario where bearer transferring of a data flow occurs when the terminal device sends uplink data to the network side.

The data flow in this implementation can be understood as a QoS Flow. The first network device may be an original node and the second network device may be a destination node. In addition, the first network device and the second network device may be a Master Node (MN) and a Secondary Node (SN) in Dual Connectivity (DC), respectively. Of course, they may also be other nodes in a DC scenario, but the details are not repeated here.

It should also be pointed out that the data flow in this implementation may be a QoS Flow.

When the bearer of the data flow is transferred from the first network device to the second network device, the Data Radio Bearer (DRB) of the first network device continues to be maintained, a first partial PDCP PDUs of the data flow, which have not been acknowledged, sent from the terminal device are received. That is to say, when a QoS Flow is transferred from one network device to another, such as transferred from MN to SN, the DRB of an original side network device continues to be maintained after bearer is changed, and a protocol stack corresponding to an original side node in a UE continues to transmit the first partial PDCP PDUs of the data flow which have not acknowledged by ACK to the first network device (e.g., an MN) through the original bearer.

In addition, the terminal device transmits the second partial data of the data flow to the second network device while executing the aforementioned solution.

When the terminal device transmits the first partial data of the data flow to the first network device completely, the terminal device generates the second indication information, and then transmits the second indication information to the first network device.

Herein, the second indication information may be a blank data packet, or may be a data packet which contains a preset identifier. Herein, the preset identifier may be set according to an actual condition, for example, it may be N-bit data, and the N-bit data is in a preset arrangement, which is not exhaustive in this implementation.

Receiving the first partial data of the data flow sent from the first network device and the second indication information includes: receiving the first partial data of the data flow sent from the first network device and the second indication information through an Xn interface; or receiving the second indication information sent from the first network device includes: receiving the second indication information of the data flow sent the first network device through the Xn interface.

The method further includes: a GTP tunnel is established with the first network device on the Xn interface; herein the GTP tunnel is used for receiving data sent by the first network device.

The method further includes: whether the second indication information is received is judged, if the second indication information is not received, then the second partial data of the data flow are kept not being sent to the core network; if the second indication information is received, then after the first partial data are controlled to be sent to the core network, the received second partial data of the data flow are delivered to the core network. That is, when the first network device receives the first partial data and the second indication sent from the terminal device based on the original bearer, the first network device sends the information to the second network device in real time through the GTP tunnel established by the Xn interface with the second network device. The second network device sorts the first partial data and the second partial data received by the second network device and then submits the sorted data to an upper layer.

The above scenario will be described below with reference to FIG. 9: for UL, firstly, when an SN node is established or during bearer changing, a GTP tunnel is established on an Xn interface between an MN and the SN for transmitting data received by an original side.

When a bearer of a QoS Flow is transferred from one node to another node, for example, transferred from MN to SN, a DRB of the original side node continues to be maintained after bearer is changed, and a protocol stack which corresponds to an original side node in a terminal continues to transmit PDCP PDUs which have not been acknowledged by ACK. As shown in the figure, the terminal device continues to send a first partial data of Flow 1 to the MN; and the second indication information is transmitted to the original side node when the first partial data of the Flow 1 is transmitted completely. Herein the second indication information may be located in a last data packet of the first partial data; and the second indication information is used for telling the original side node that the unfinished data transmission of the transferred QoS Flow has been completed.

The original side node delivers the first partial data, such as SDAP SDUs, of the Flow 1 which are received, and an SDAP end marker, i.e. the second indication information, to the target side node (SN) through the Xn interface; and the target side node (SN) first sends data, SDAP SDUs, from the original side node to the core network, and after receiving the second indication information, sends second partial data of the Flow 1 which are received by the local side to the core network.

Or, when the first partial data of the Flow 1 which are received by the original side node, for example, SDAP SDUs, and an SDAP end marker, i.e., the second indication information, are received, the original side node first sends the SDAP SDUs which are received to the core network through an GTP tunnel corresponding to a PDU session between the local node and the core network, and then transfers the SDAP end marker to the target side through the Xn interface. After the target side receives the second indication information, i.e., the SDAP end marker indication, it sends data received by the local side to the core network.

It can be seen that by adopting the above solution, it is able that when a bearer of a data flow is transferred from the first network device to the second network device, indication information is sent to the second network device, so that the second network device starts performing, on a new bearer, in-order transmission of the transferred data flow. Therefore, it can be ensured that when data flow transferring occurs, a destination network device side can ensure the order of data transmission.

Implementation Seven

The implementation of the present application provides a first network device, including: a first communication unit, which sends, when a bearer of a data flow is transferred from the first network device to a second network device, first indication information to the second network device. Herein the first indication information is used for indicating the second network device to start performing, on a new bearer, in-order transmission of the transferred data flow.

The data flow in this implementation can be understood as a QoS Flow; the first network device may be an original node and the second network device may be a destination node. In addition, the first network device and the second network device may be a Master Node (MN) and a Secondary Node (SN) in Dual Connectivity (DC), respectively. Of course, they may also be other nodes in a DC scenario, but the details are not repeated here.

It should also be pointed out that the Flow in this implementation may be a QoS Flow.

In addition, when the bearer of the data flow is transferred from the first network device to the second network device, the first communication unit maintains an original Data Radio Bearer (DRB), transmits the first partial data of the data flow which have not been acknowledged to the terminal device, and forwards second partial data from a core network to the second network device.

Herein, the having not been acknowledged may be partial data for which ACK acknowledgement information sent from a receiving end has not been gotten. Moreover, the second partial data of the data flow are data which are still at the first network device while the data flow is transferred from the first network device to the second network device.

At this time, it may further include: the first communication unit keeps sending the second partial data to the second network device till this partial data are sent out.

When the second partial data of the data flow are completely sent to the second network device, the first indication information is generated, and then the first indication information is sent to the second network device.

Herein, the first indication information may be a blank data packet, or may be a data packet which contains a preset identifier. Herein, the preset identifier may be set according to an actual condition, for example, it may be N-bit data, and the N-bit data is in a preset arrangement, which is not exhaustive in this implementation.

Further, the first communication unit sends the first indication information to the second network device through an Xn interface.

The above scenario will be described below with reference to FIG. 7: for DownLink (DL) data, when a QoS Flow 1 is transferred from one node to another node, for example, transferred from MN to SN, a DRB of an original side node continues to be maintained (which may be for the first partial data of QoS Flow 1 sent from Access and Mobility Management Function (AMF)) after bearer is changed, the first partial data of the Flow 1 are kept being sent to the terminal device through an original bearer, and the original side node continues to transmit a first partial PDCP PDUs of the QoS Flow 1, that is, the first partial data of the QoS Flow 1, which have not been acknowledged by ACK. At the same time, the first network device receives second partial data from the core network and sends the second partial data to the second network device (i.e. the SN) till a remaining second part of the PDCP PDUs of the QoS Flow 1 which have not been acknowledged by ACK are all transmitted to the SN completely, and then the original side node (MN) sends the first indication information to a target side (SN) through the Xn interface. Herein, the indication indicates that the target side may start performing, on a new bearer, data transmission of the above transferred QoS Flow. It should also be pointed out that after the SN, that is, the second network device in this implementation, receives the second partial data of the data flow and the first indication information, it transmits the second partial data first and then transmits its own third partial data. In this way, it is ensured that the transmitted data will not be out of order.

It can be seen that by adopting the above solution, it is able that when a bearer of a data flow is transferred from a first network device to a second network device, the first network device sends the second network device first indication information, through which the second network device is caused to start performing, on a new bearer, in-order transmission of the transferred data flow. Therefore, it can be ensured that when data flow transferring occurs, a destination network device side can ensure the order of data transmission.

Implementation Eight

Figure 12:
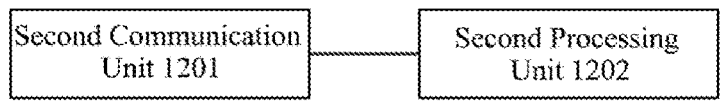
FIG. 12 is schematic diagram one of structure of a network device according to an implementation of the present disclosure.

The implementation of the present application provides a second network device, as shown in FIG. 12, including: a second communication unit 1201, which receives, when a bearer of a data flow is transferred from a first network device to the second network device, first indication information sent from the first network device; herein the first indication information is used for indicating the second network device to start performing, on a new bearer, in-order transmission of the transferred data flow.

The data flow in this implementation can be understood as a QoS Flow. The first network device may be an original node and the second network device may be a destination node. In addition, the first network device and the second network device may be a Master Node (MN) and a Secondary Node (SN) in Dual Connectivity (DC), respectively. Of course, they may also be other nodes in a DC scenario, but the details are not repeated here.

It should also be pointed out that the Flow in this implementation may be a QoS Flow.

In addition, when the bearer of the data flow is transferred from the first network device to the second network device, the first network device maintains an original Data Radio Bearer (DRB), and transmits second partial data to the second network device.

When the second partial data of the data flow is completely sent to the second network device, the first indication information is generated, and then the first indication information is sent to the second network device.

Herein, the first indication information may be a blank data packet, or may be a data packet which contains a preset identifier. Herein, the preset identifier may be set according to an actual condition, for example, it may be N-bit data, and the N-bit data is in a preset arrangement, which is not exhaustive in this implementation.

Further, the second communication unit 1201 receives the first indication information sent by the first network device through an Xn interface.

When the second network device receives the first indication information, the second communication unit 1201 may start performing, on a new bearer, in-order transmission of the transferred data flow.

The second network device further includes: a second processing unit 1202, which sorts, based on the first indication information, the first partial data of the data flow and the second partial data and then transmits the sorted data.

The second communication unit 1201 receives third partial data sent by the core network device; that is, when the bearer of the data flow is transferred, the second network device starts receiving the third partial data from a core network.

When the second network device receives the first indication information, the second network device may start performing, on a new bearer, in-order transmission of the transferred data flow. Herein the transmission in order may be that the second partial data are arranged before the third partial data for transmission.

Since the second partial data occurs when the data flow is transferred, the second partial data precedes the third partial data. Therefore, when sorting, the second partial data are arranged before the third partial data for transmission, thus it can be ensured that out of order does not appear when the bearer of the data flow is transferred.

The above scenario will be described below with reference to FIG. 7: for DownLink (DL) data, when a QoS Flow 1 is transferred from one node to another node, for example, transferred from MN to SN, a DRB of an original side node continues to be maintained (which may be for the first partial data of QoS Flow 1 sent from Access and Mobility Management Function (AMF)) after bearer is changed, the first partial data of the Flow 1 are kept being sent to the terminal device through an original bearer, and the original side node continues to transmit a first partial PDCP PDUs of the QoS Flow 1, that is, the first partial data of the QoS Flow 1, which have not been acknowledged by ACK. At the same time, the first network device receives second partial data from the core network and sends the second partial data to the second network device (i.e. the SN) till a remaining second part of the PDCP PDUs of the QoS Flow 1 which have not been acknowledged by ACK are all transmitted to the SN completely, and then the original side node (MN) sends the first indication information to a target side (SN) through the Xn interface. Herein, the indication indicates that the target side may start performing, on a new bearer, data transmission of the above transferred QoS Flow. It should also be pointed out that after the SN, that is, the second network device in this implementation, receives the second partial data of the data flow and the first indication information, it transmits the second partial data first and then transmits its own third partial data. In this way, it is ensured that the transmitted data will not be out of order.

It can be seen that by adopting the above solution, it is able that when a bearer of a data flow is transferred from a first network device to a second network device, the first network device sends the second network device first indication information, through which the second network device is caused to start performing, on a new bearer, transmission of the transferred data flow in order. Therefore, it can be ensured that when data flow transferring occurs, a destination network device side can ensure the order of data transmission.

Implementation Nine

The implementation of the present application provides a terminal device, including: a sixth communication unit, which receives, when a bearer of a data flow is transferred from a first network device to a second network device, first partial data of the data flow sent from the first network device.

The data flow in this implementation can be understood as a QoS Flow. The first network device may be an original node and the second network device may be a destination node. In addition, the first network device and the second network device may be a Master Node (MN) and a Secondary Node (SN) in Dual Connectivity (DC), respectively. Of course, they may also be other nodes in a DC scenario, but the details are not repeated here.

It should also be pointed out that the data flow in this implementation may be a QoS Flow.

In addition, when the bearer of the data flow is transferred from the first network device to the second network device, the first network device maintains an original Data Radio Bearer (DRB), transmits the first partial data of the data flow which have not been acknowledged to the terminal device, and forwards second partial data from a core network to the second network device.

The sixth communication unit maintains the original Data Radio Bearer (DRB) with the first network device and receives the first partial data of the data flow which have not been acknowledged transmitted by the first network device.

The above scenario will be described below with reference to FIG. 7: for DownLink (DL) data, when a QoS data flow (Flow) 1 is transferred from one node to another node, for example, transferred from MN to SN, a DRB of an original side node continues to be maintained (which may be for the first partial data of QoS Flow 1 sent from Access and Mobility Management Function (AMF)) after bearer is changed, the first partial data of the Flow 1 are kept being sent to the terminal device through an original bearer, and the original side node continues to transmit a first partial PDCP PDUs of the QoS Flow 1, that is, the first partial data of the QoS Flow 1, which have not been acknowledged by ACK. At the same time, the first network device receives second partial data from the core network and sends the second partial data to the second network device (i.e. the SN) till a remaining second part of the PDCP PDUs of the QoS Flow 1 which have not been acknowledged by ACK are all transmitted to the SN completely, and then the original side node (MN) sends the first indication information to a target side (SN) through the Xn interface. Herein, the indication indicates that the target side may start performing, on a new bearer, data transmission of the above transferred QoS Flow. It should also be pointed out that after the SN, that is, the second network device in this implementation, receives the second partial data of the data flow and the first indication information, it transmits the second partial data first and then transmits its own third partial data. In this way, it is ensured that the transmitted data will not be out of order.

It can be seen that by adopting the above solution, it is able that when a bearer of a data flow is transferred from a first network device to a second network device, the first network device sends the second network device first indication information, through which the second network device is caused to start performing, on a new bearer, in-order transmission of the transferred data flow. Therefore, it can be ensured that when Flow transferring occurs, a destination network device side can ensure the order of data transmission.

Implementation Ten

The implementation of the present application provides a terminal device, including: a third communication unit, which transmits, when a bearer of a data flow is transferred from a first network device to a second network device, first partial data of the data flow and second indication information to the first network device; and the second indication information is used for indicating that the first partial data in the data flow, which have not been transmitted completely when the transferring occurs, are transmitted completely.

This implementation is applicable to a scenario where bearer transferring of a data flow occurs when the terminal device sends uplink data to the network side.

The data flow in this implementation can be understood as a QoS Flow. The first network device may be an original node and the second network device may be a destination node. In addition, the first network device and the second network device may be a Master Node (MN) and a Secondary Node (SN) in Dual Connectivity (DC), respectively. Of course, they may also be other nodes in a DC scenario, but the details are not repeated here.

It should also be pointed out that the Flow in this implementation may be a QoS Flow.

The third communication unit maintains, when the bearer of the data flow is transferred from the first network device to the second network device, a Data Radio Bearer (DRB) with the first network device, and sends a first partial PDCP PDUs of the data flow which have not been acknowledged to the first network device.

That is to say, when a QoS Flow is transferred from one network device to another, such as transferred from MN to SN, the DRB of an original side network device continues to be maintained after bearer is changed, and a protocol stack corresponding to an original side node in a UE continues to transmit the first partial PDCP PDUs of the data flow which have not acknowledged by ACK to the first network device (e.g., an MN) through the original bearer.

In addition, the third communication unit transmits the second partial data of the data flow to the second network device while executing the aforementioned solution.

The third communication unit generates, when transmitting the first partial data of the data flow to the first network device completely, the second indication information, and then transmits the second indication information to the first network device.

Herein, the second indication information may be a blank data packet, or may be a data packet which contains a preset identifier. Herein, the preset identifier may be set according to an actual condition, for example, it may be N-bit data, and the N-bit data is in a preset arrangement, which is not exhaustive in this implementation.

The above scenario will be described below with reference to FIG. 9: for UL, firstly, when an SN node is established or during bearer changing, a GTP tunnel is established on an Xn interface between an MN and the SN for transmitting data received by an original side.

When a bearer of a QoS Flow is transferred from one node to another node, for example, transferred from MN to SN, a DRB of the original side node continues to be maintained after bearer is changed, and a protocol stack which corresponds to an original side node in a terminal continues to transmit PDCP PDUs which have not been acknowledged by ACK. As shown in the figure, the terminal device continues to send a first partial data of Flow 1 to the MN, and the second indication information is transmitted to the original side node when the first partial data of the Flow 1 is transmitted completely. Herein the second indication information may be located in a last data packet of the first partial data, and the second indication information is used for telling the original side node that the unfinished data transmission of the transferred QoS Flow has been completed.

The original side node delivers the first partial data, such as SDAP SDUs, of the Flow 1 which are received, and an SDAP end marker, i.e. the second indication information, to the target side node (SN) through the Xn interface; and the target side node (SN) first sends data, SDAP SDUs, from the original side node to a core network, and after receiving the second indication information, sends second partial data of the Flow 1 which are received by the local side to the core network.

It can be seen that by adopting the above solution, it is able that when a bearer of a data flow is transferred from the first network device to the second network device, indication information is sent to the second network device, so that the second network device starts performing, on a new bearer, in-order transmission of the transferred data flow. Therefore, it can be ensured that when data flow transferring occurs, a destination network device side can Ensure an Order of Data Transmission.

Implementation Eleven

The implementation of the present application provides a first network device, including: a fourth communication unit, which receives, when a bearer of a data flow is transferred from the first network device to a second network device, first partial data of the data flow sent from a terminal device and second indication information sent from the terminal device; the second indication information is used for indicating that the first partial data in the data flow, which have not been transmitted completely when the transferring occurs, are transmitted completely; and sends the first partial data of the data flow and the second indication information to the second network device, or sends the first partial data of the data flow to a core network and sends the second indication information to the second network device.

This implementation is applicable to a scenario where bearer transferring of a data flow occurs when the terminal device sends uplink data to the network side.

The data flow in this implementation can be understood as a QoS Flow. The first network device may be an original node and the second network device may be a destination node. In addition, the first network device and the second network device may be a Master Node (MN) and a Secondary Node (SN) in Dual Connectivity (DC), respectively. Of course, they may also be other nodes in a DC scenario, but the details are not repeated here.

It should also be pointed out that the data flow in this implementation may be a QoS Flow.

The fourth communication unit receives, when the bearer of the data flow is transferred from the first network device to the second network device and the Data Radio Bearer (DRB) is continuously maintained, the first partial PDCP PDUs of the data flow, which have not been acknowledged, sent from the terminal device.

That is to say, when a QoS Flow is transferred from one network device to another, such as transferred from MN to SN, the DRB of an original side network device continues to be maintained after bearer is changed, and a protocol stack corresponding to an original side node in a UE continues to transmit the first partial PDCP PDUs of the data flow which have not acknowledged by ACK to the first network device (e.g., an MN) through the original bearer.

In addition, the terminal device transmits the second partial data of the data flow to the second network device while executing the aforementioned solution.

When the terminal device transmits the first partial data of the data flow to the first network device completely, the terminal device generates the second indication information, and then transmits the second indication information to the first network device.

Herein, the second indication information may be a blank data packet, or may be a data packet which contains a preset identifier. Herein, the preset identifier may be set according to an actual condition, for example, it may be N-bit data, and the N-bit data is in a preset arrangement, which is not exhaustive in this implementation.

The fourth communication unit sends the first partial data of the data flow and the second indication information to the second network device through an Xn interface.

Or, the fourth communication unit sends the first partial data of the data flow to the core network through a GTP tunnel with the core network, and sends the second indication information to the second network device through an Xn interface.

The fourth communication unit establishes, on the Xn interface, a GTP tunnel with the second network device; herein the GTP tunnel is used for performing data forwarding to the second network device.

That is, when the first network device receives the first partial data and the second indication sent from the terminal device based on the original bearer, the first network device sends the information to the second network device in real time through the GTP tunnel established by the Xn interface with the second network device, so that the second network device sorts the first partial data and the second partial data received by the second network device, and then submits the sorted data to an upper layer.

The above scenario will be described below with reference to FIG. 9: for UL, firstly, when an SN node is established or during bearer changing, a GTP tunnel is established on an Xn interface between an MN and the SN for transmitting data received by an original side.

When a bearer of a QoS Flow is transferred from one node to another node, for example, transferred from MN to SN, a DRB of the original side node continues to be maintained after bearer is changed, and a protocol stack which corresponds to an original side node in a terminal continues to transmit PDCP PDUs which have not been acknowledged by ACK. As shown in the figure, the terminal device continues to send a first partial data of Flow 1 to the MN, and the second indication information is transmitted to the original side node when the first partial data of the Flow 1 is transmitted completely. Herein the second indication information may be located in a last data packet of the first partial data, and the second indication information is used for telling the original side node that the unfinished data transmission of the transferred QoS Flow has been completed.

The original side node delivers the first partial data, such as SDAP SDUs, of the Flow 1 which are received, and an SDAP end marker, i.e. the second indication information, to the target side node (SN) through the Xn interface; and the target side node (SN) first sends data, SDAP SDUs, from the original side node to the core network, and after receiving the second indication information, sends second partial data of the Flow 1 which are received by the local side to the core network.

Or, when the first partial data of the Flow 1 are received by the original side node, for example, when SDAP SDUs and an SDAP end marker, i.e., the second indication information, are received, the original side node first sends the received SDAP SDUs to the core network through an GTP tunnel corresponding to a PDU session between the local node and the core network, and then transfers the SDAP end marker to the target side through the Xn interface. After the target side receives the second indication information, i.e., the SDAP end marker indication, it sends data received by the local side to the core network.

It can be seen that by adopting the above solution, it is able that when a bearer of a data flow is transferred from the first network device to the second network device, indication information is sent to the second network device, so that the second network device starts performing, on a new bearer, in-order transmission of the transferred data flow. Therefore, it can be ensured that when data flow transferring occurs, a destination network device side can ensure an order of data transmission.

Implementation Twelve

Figure 13:
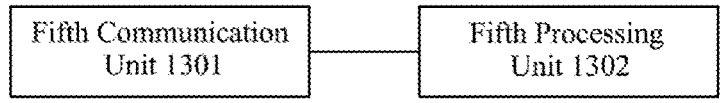
FIG. 13 is schematic diagram two of structure of a network device according to an implementation of the present disclosure.

The implementation of the present application provides a second network device, as shown in FIG. 13, including: a fifth communication unit 1301, which receives, when a bearer of a data flow is transferred from a first network device to the second network device, first partial data of the data flow and second indication information sent from the first network device, or receives second indication information sent from the first network device; the second indication information is used for indicating that the first partial data in the data flow, which have not been transmitted completely when the transferring occurs, are transmitted completely; and a fifth processing unit 1302, which delivers, based on the second indication information, second partial data of the data flow to the core network after delivering the first partial data to the core network.

This implementation is applicable to a scenario where bearer transferring of a data flow occurs when the terminal device sends uplink data to the network side.

The data flow in this implementation can be understood as a QoS Flow. The first network device may be an original node and the second network device may be a destination node. In addition, the first network device and the second network device may be a Master Node (MN) and a Secondary Node (SN) in Dual Connectivity (DC), respectively. Of course, they may also be other nodes in a DC scenario, but the details are not repeated here.

It should also be pointed out that the data flow in this implementation may be a QoS Flow.

When the bearer of the data flow is transferred from the first network device to the second network device, the Data Radio Bearer (DRB) of the first network device continues to be maintained and a first partial PDCP PDUs of the data flow, which have not been acknowledged, sent from the terminal device are received. That is to say, when a QoS Flow is transferred from one network device to another, such as transferred from MN to SN, the DRB of an original side network device continues to be maintained after bearer is changed, and a protocol stack corresponding to an original side node in a UE continues to transmit the first partial PDCP PDUs of the data flow which have not acknowledged by ACK to the first network device (e.g., an MN) through the original bearer.

In addition, the terminal device transmits the second partial data of the data flow to the second network device while executing the aforementioned solution.

When the terminal device transmits the first partial data of the data flow to the first network device completely, the terminal device generates the second indication information, and then transmits the second indication information to the first network device.

Herein, the second indication information may be a blank data packet, or may be a data packet which contains a preset identifier. Herein, the preset identifier may be set according to an actual condition, for example, it may be N-bit data, and the N-bit data is in a preset arrangement, which is not exhaustive in this implementation.

The fifth communication unit 1301 receives the first partial data of the data flow sent from the first network device and the second indication information through an Xn interface.

Or, the fifth communication unit 1301 receives the second indication information of the data flow sent from the first network device through the Xn interface.

The fifth communication unit 1301 establishes a GTP tunnel with the first network device on the Xn interface; herein the GTP tunnel is used for receiving data sent by the first network device.

The fifth processing unit 1302 judges whether the second indication information is received, if the second indication information is not received, then the second partial data of the data flow are kept not being sent to the core network; if the second indication information is received, then after the first partial data are controlled to be sent to the core network, the second partial data of the data flow which are received are delivered to the core network. That is, when the first network device receives the first partial data and the second indication sent from the terminal device based on the original bearer, the first network device sends the information to the second network device in real time through the GTP tunnel established by the Xn interface with the second network device. The second network device sorts the first partial data and the second partial data received by the second network device and then submits the sorted data to an upper layer.

The above scenario will be described below with reference to FIG. 9: for UL, firstly, when an SN node is established or during bearer changing, a GTP tunnel is established on an Xn interface between an MN and the SN for transmitting data forwarding received by an original side.

When a bearer of a QoS data Flow is transferred from one node to another node, for example, transferred from MN to SN, a DRB of the original side node continues to be maintained after bearer is changed, and a protocol stack which corresponds to an original side node in a terminal continues to transmit PDCP PDUs which have not been acknowledged by ACK. As shown in the figure, the terminal device continues to send a first partial data of Flow 1 to the MN, and the second indication information is transmitted to the original side node when the first partial data of the Flow 1 is transmitted completely. Herein the second indication information may be located in a last data packet of the first partial data, and the second indication information is used for telling the original side node that the unfinished data transmission of the transferred QoS Flow has been completed.

The original side node delivers the received first partial data, such as SDAP SDUs, of the Flow 1, and an SDAP end marker, i.e. the second indication information, to the target side node (SN) through the Xn interface; and the target side node (SN) first sends data, SDAP SDUs, from the original side node to the core network, and sends second partial data of the Flow 1 which are received by the local side to the core network after receiving the second indication information.

Or, when the first partial data of the Flow 1 which are received by the original side node, for example, SDAP SDUs and an SDAP end marker, i.e., the second indication information, are received, the original side node first sends the received SDAP SDUs to the core network through an GTP tunnel corresponding to a PDU session between the local node and the core network, and then transfers the SDAP end marker to the target side through the Xn interface. After the target side receives the second indication information, i.e., the SDAP end marker indication, it sends data received by the local side to the core network.

It can be seen that by adopting the above solution, it is able that when a bearer of a data flow is transferred from the first network device to the second network device, indication information is sent to the second network device, so that the second network device starts performing, on a new bearer, in-order transmission of the transferred data flow. Therefore, it can be ensured that when data flow transferring occurs, a destination network device side can ensure an order of data transmission.

Figure 14:
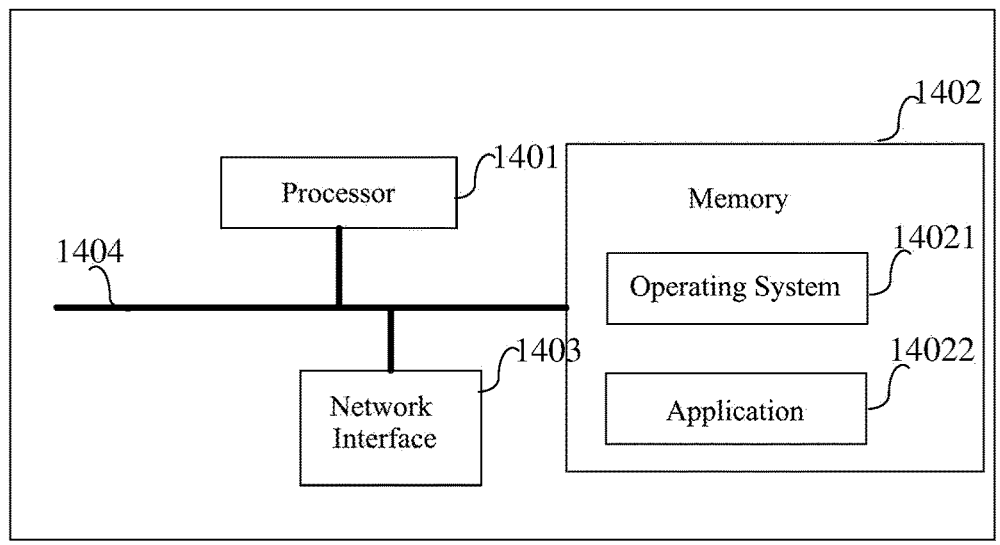
FIG. 14 is a schematic diagram of architecture of hardware according to an implementation of the present disclosure.

An implementation of the present disclosure further provides architecture of hardware components of a terminal device or a network device. As shown in FIG. 14, the architecture includes at least one processor 1401, a memory 1402, and at least one network interface 1403. The various components are coupled together by a bus system 1404. It may be understood that the bus system 1404 is used for implementing connection and communication between these components. In addition to a data bus, the bus system 1404 includes a power bus, a control bus, and a status signal bus. However, for clarity, all kinds of buses are uniformly referred to as a bus system 1404 in the FIG. 14.

It should be understood that the memory 1402 in the implementation of the present disclosure may be a volatile memory or a non-volatile memory, or it may include both volatile and non-volatile memories.

In some implementations, the memory 1402 stores following elements, executable modules or data structures, or subsets thereof, or extended sets thereof: an operating system 14021 and an application 14022.

Herein, the processor 1401 is configured to be capable of processing acts of the methods in any one of the aforementioned Implementations one to five, which will not be repeated here.

An implementation of the present disclosure provides a computer storage medium storing computer executable instructions, and the computer executable instructions implements, when being executed, acts of the methods in any one of the aforementioned implementations one to five.

The above device in the implementations of the present disclosure may also be stored in a computer readable storage medium when it is implemented in the form of a software function module and sold or used as an independent product. Based on this understanding, the technical solutions in the implementations of the present disclosure, in essence, or the part contributing to the prior art, may be embodied in the form of a software product stored in a storage medium, including several instructions for causing a computer device (which may be a personal computer, a server, or a network device, etc.) to perform all or part of the methods described in various implementations of the present disclosure. The aforementioned storage medium includes a U disk, a mobile hard disk, a read-only memory (ROM), a magnetic disk or an optical disk, and another media capable of storing program codes. Thus, the implementations of the present disclosure are not limited to any specific combination of hardware and software.

Although the preferable implementations of the present disclosure have been disclosed for illustrative purposes, those skilled in the art will recognize that various modifications, additions and substitutions are also possible, and therefore, the scope of the present disclosure should not be limited to the above implementations.

What is claimed is:

1. A method for delivering data in order, which is applied to a first network device, comprising:
in a case that a bearer of a data flow is transferred from the first network device to a second network device, receiving, from a terminal device, first partial data of the data flow and a SDAP (Service Data Adaptation Protocol) end marker for indicating that the first partial data in the data flow, which have not been transmitted completely when transferring occurs, are transmitted completely; and
sending the first partial data of the data flow to a core network and sending the SDAP end marker for indicating that the first partial data in the data flow, which have not been transmitted completely when the transferring occurs, are transmitted completely to the second network device;
wherein receiving the first partial data of the data flow sent from the terminal device comprises: when the bearer of the data flow is transferred with a Data Radio Bearer (DRB) of the first network device continuing to be maintained, receiving a first partial Packet Data Convergence Protocol (PDCP) Protocol Data Units (PDUs) of the data flow, which have not been acknowledged, sent from the terminal device.

2. The method according to claim 1, wherein, when sending the first partial data of the data flow to the core network and sending the SDAP end marker to the second network device,
the first partial data of the data flow are sent to the core network through a General Packet Radio Service (GPRS) Tunnelling Protocol (GTP) tunnel with the core network; and
the SDAP end marker is sent to the second network device through an Xn interface.

3. The method according to claim 1, further comprising:
establishing a GTP tunnel with the second network device on an Xn interface; wherein the GTP tunnel is used for performing data forwarding to the second network device.

4. A method for delivering data in sequence, which is applied to a second network device, comprising:
in a case that a bearer of a data flow is transferred from a first network device to the second network device, receiving a SDAP (Service Data Adaptation Protocol) end marker, sent from the first network device, for indicating that the first partial data in the data flow, which have not been transmitted completely from a terminal device to the first network device when transferring occurs, are transmitted completely;
based on the SDAP end marker, delivering, by the second network device, second partial data of the data flow from the terminal device to a core network after the first partial data are sent to the core network;
wherein when the bearer of the data flow is transferred with a Data Radio Bearer (DRB) of the first network device continuing to be maintained, receiving a first partial Packet Data Convergence Protocol (PDCP) Protocol Data Units (PDUs) of the data flow, which have not been acknowledged, sent from the terminal device.

5. The method according to claim 4, wherein receiving the SDAP end marker, sent from the first network device, for indicating that the first partial data in the data flow, which have not been transmitted completely when the transferring occurs, are transmitted completely, comprises:
receiving the SDAP end marker of the data flow, sent from the first network device, for indicating that the first partial data in the data flow, which have not been transmitted completely when the transferring occurs, are transmitted completely through an Xn interface.

6. The method according to claim 4, wherein the method further comprises:
judging whether the SDAP end marker is received, when the SDAP end marker is not received, then keeping not sending the second partial data of the data flow to the core network;
when the SDAP end marker is received, then delivering the received second partial data of the data flow to the core network after the first partial data are sent to the core network.

7. A first network device, comprising: a processor, and a memory used for storing a computer program which is capable of being run on the processor, wherein the processor is configured to, when running the computer program,
in a case that a bearer of a data flow is transferred from the first network device to a second network device, receive, from a terminal device, first partial data of the data flow and a SDAP (Service Data Adaptation Protocol) end marker for indicating that the first partial data in the data flow, which have not been transmitted completely when transferring occurs, are transmitted completely; and send the first partial data of the data flow to a core network and send the SDAP end marker for indicating that the first partial data in the data flow, which have not been transmitted completely when the transferring occurs, are transmitted completely to the second network device;
wherein, the processor is configured to:
in a case that the bearer of the data flow is transferred from the first network device to the second network device, with the Data Radio Bearer (DRB) continuing to be maintained, receive a first partial Packet Data Convergence Protocol (PDCP) Protocol Data Units (PDUs) of the data flow, which have not been acknowledged, sent from the terminal device.

8. The first network device according to claim 7, wherein, the processor is configured to:
send the first partial data of the data flow to the core network through a General Packet Radio Service (GPRS) Tunnelling Protocol (GTP) tunnel with the core network;
and send the SDAP end marker to the second network device through an Xn interface.

9. The first network device according to claim 7, wherein, the processor is configured to:
establish, on an Xn interface, a GTP tunnel with the second network device; wherein the GTP tunnel is used for performing data forwarding to the second network device.

10. A second network device, comprising: a processor, and a memory used for storing a computer program which is capable of being run on the processor, wherein the processor is configured to, when running the computer program,
in a case that a bearer of a data flow is transferred from a first network device to the second network device, receive a SDAP (Service Data Adaptation Protocol) end marker, sent from a first network device, for indicating that the first partial data in the data flow, which have not been transmitted completely from a terminal device to the first network device when transferring occurs, are transmitted completely;
based on the SDAP end marker, deliver second partial data of the data flow from the terminal device to a core network after the first partial data are sent to the core network,
wherein when the bearer of the data flow is transferred with a Data Radio Bearer (DRB) of the first network device continuing to be maintained, receiving a first partial Packet Data Convergence Protocol (PDCP) Protocol Data Units (PDUs) of the data flow, which have not been acknowledged, sent from the terminal device.

11. The second network device according to claim 10, wherein the processor is configured to receive the SDAP end marker of the data flow sent from the first network device through an Xn interface.

12. The second network device according to claim 10, wherein the processor is configured to judge whether the SDAP end marker is received, when the SDAP end marker is not received, then keep not sending the second partial data of the data flow to the core network;
when the SDAP end marker is received, then deliver the received second partial data of the data flow to the core network after the first partial data are sent to the core network.

* * * * *